March 17, 1964 T. S. KULKA 3,125,220

COMBINED REEL CHEST AND TAPE RETAINING MEANS

Filed June 21, 1962

INVENTOR
THOMAS S. KULKA

BY Almon S. Nelson

ATTORNEY

United States Patent Office 3,125,220
Patented Mar. 17, 1964

3,125,220

COMBINED REEL CHEST AND TAPE RETAINING MEANS

Thomas S. Kulka, 200 Film Bldg., 2108 Payne Ave., Cleveland 14, Ohio

Filed June 21, 1962, Ser. No. 204,130
20 Claims. (Cl. 206—59)

This invention relates to the utilization and storage of tapes commonly employed in the magnetic recording of sound or for film used in motion pictures and more particularly to devices for housing or partially housing the reels upon which such tape is commonly wound and for simultaneously preventing unwinding of the tape from such reels.

This application is a continuation in part of my copending application Serial No. 767,866 filed October 17, 1958, now Patent No. 3,078,987 dated February 26, 1963, which in turn is a continuation in part of application Serial No. 494,771 filed March 16, 1955 and now Patent No. 2,867,318 dated January 6, 1959.

The use of tape coated with a magnetic substance for recording sound has increased to a remarkable extent over the past few years, and in order to prevent damage to the tape which is commonly stored on reels, it is imperative that some means be provided to house or partially house such reels and, at the same time, prevent inadvertent unwinding of the tape therefrom. This means should be relatively inexpensive and should be capable of application to the reel with a minimum of effort and, at the same time, provide an effective means for holding the tape against unwinding and without damage to such tape or the reel upon which the same is wound. It is further desirable that means be provided for housing or partially housing the reel in order to protect the same and prevent an undesirable accumulation of dust or other foreign substance thereon and, obviously, such housing means should occupy a minimum of space.

Heretofore it has been common practice to prevent the unwinding of tape from a reel by merely placing an elastic band or the like about such tape on the reel and storing the reel, either in individual boxes or containers or storing a plurality of reels in a single container. It has also been proposed to utilize various types of clips or spring means which attach to the reel and in various ways engage the tape thereon to prevent inadvertent unwinding. Unfortunately, the use of many of these prior art devices for preventing inadvertent unwinding of the tape requires a considerable degree of manual dexterity in order to hold the reel, prevent the tape from unwinding and apply the device to the reel in such a manner as to properly engage the tape and, at the same time, prevent damage thereto by scratching or other damage caused by too great a pressure on the tape. Furthermore, many of these prior art devices were completely useless for preventing the unwinding of tape from a reel when such tape only partially filled the reel leaving a relatively wide space between the outer circumference of the tape and the outer circumference of the flanges of the reel. Furthermore, few, if any, of these prior art devices provided any means for simultaneously housing or protecting the reels of tape and it was, therefore, necessary to apply the clip or other securing means to the reel and thereafter insert the reel in whatever container was provided therefor. It appears obvious that a combined housing and tape retaining means in which it is only necessary to insert the reel in the housing and, at the same time, engage the tape retaining means with the tape on such reel would be highly desirable and represent a very material step forward in the art.

It is accordingly an object of this invention to provide a combined housing and tape retaining means for tape holding reels which may be economically manufactured from readily available materials and in which the reel may be inserted therein in proper position for preventing unwinding of the tape by a simple manual operation.

A further object of the invention is the provision of a combined housing and tape retaining means for tape holding reels in which the tape retaining means may be conveniently renewed in the event of breakage or damage thereto.

A still further object of the invention is the provision of a combined housing and tape retaining means for tape holding reels in which the tape retaining means is fully operative to prevent inadvertent unwinding of the tape regardless of the length of such tape present on the reel.

Another object of the invention is the provision of a combined housing and tape retaining means for tape holding reels in which the tape retaining means operates to retain the reel in the housing and, at the same time, prevent inadvertent unwinding of the tape thereon.

A further object of the invention is the provision of a combined housing and tape retaining means for tape holding reels in which the tape retaining means may take the form of an elastic band provided with an enlarged tape engaging member having a thickness or diameter greater than the thickness or diameter of the band for engaging the tape on the reel and preventing entry of the band between the tape and a flange of the reel.

A still further object of the invention is the provision of a combined housing and tape retaining means for tape holding reels in the form of a chest for receiving one or more reels in individual compartments and in which the upper edges of the chest may, if desired, be inclined for convenience, the tape on each reel being engaged by an elastic band to prevent inadvertent unwinding therefrom, the elastic band also serving to retain the reel in position in the chest.

Another object of the invention is the provision of a combined housing and tape retaining means for tape holding reels in the form of a chest for receiving one or more reels in individual compartments and in which the upper edges of the chest may, if desired, be inclined for convenience, the tape on each reel being engaged by an elastic band in the form of a coil spring to prevent inadvertent unwinding thereof, the coil spring also serving to retain the reel in position in the chest.

Further objects and advantages of the invention will be apparent from the following description taken in conjunction with the accompanying drawing, wherein.

Figure 1:
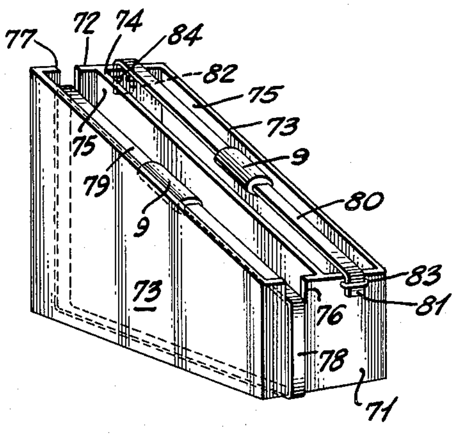
FIG. 1 is a view in perspective showing a reel receiving housing in the form of a chest and two types of tape retaining means for retaining one or more reels in the chest and also for preventing inadvertent unwinding of the tape thereon.

With continued reference to the drawing, there is shown in FIG. 1 a reel housing in the form of a chest which may well comprise a relatively low front wall 71 and a relatively high rear wall 72 connected by spaced parallel trapezoidal shaped sidewalls 73 and a bottom wall, not shown, which provides a chest having inclined upper edges and open at the top. One or more partitions 74 extend between the front and rear walls 71 and 72 respectively to provide a plurality of compartments 75, each adapted to receive a reel of tape. A separate cover may be utilized if desired to cover the open upper end of the chest or, if desired, a suitably mounted hinged cover may be provided.

Two forms of the invention are shown in FIG. 1 and in one form, a notch 76 is provided in the front wall 71 in the upper edge thereof and substantially midway of each compartment 75 and a similar notch 77 is provided in the upper edge of the rear wall 72 substantially midway of each compartment 75. An endless elastic band 78 having an enlarged tape engaging member 9 thereon extends around the bottom, front and rear walls of the chest and through the notches 76 and 77 and providing a portion 79 extending lengthwise of each compartment 75 adjacent the upper end thereof.

A reel of tape may be disposed in each compartment by sliding the same between the portion 79 of the band 78 within the compartment and the partition 74 until the same is positioned entirely within the compartment 75, at which time, the tape engaging member 9 on portion 79 of the band 78 may be positioned between the flanges of the reel and in engagement with the tape thereon to retain the reel in the compartment and prevent unwinding of the tape on such reel. In this way, one or more reels may be housed in a single chest and the tape prevented from unwinding therefrom, such reels being readily available for use at any time.

The other form of the invention shown in FIG. 1 merely involves the use of a different type of retaining band and the method of securing the same in place on the chest and in this case an elastic retaining band 80 extends lengthwise of each compartment 75 and over the upper edges of the front wall 71 and rear wall 72, the ends 81 and 82 of the band 80 being secured to the front wall and rear wall respectively by staples or other suitable fastening means 83 and 84. A reel of tape is disposed in the compartment in this form of the invention in the same manner as above described in connection with the first form of the invention shown in FIG. 1.

Figures 2, 3:
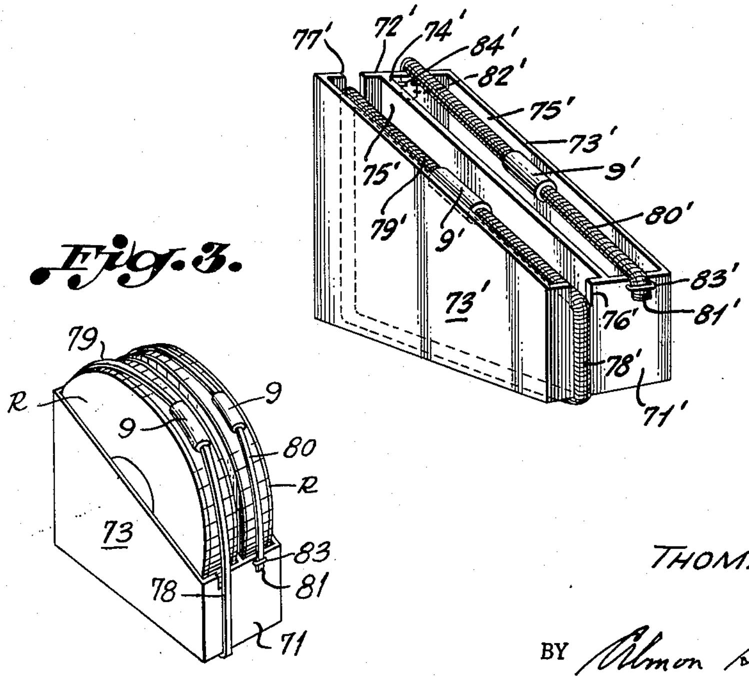
FIG. 2 is a view similar to FIG. 1, but showing the tape retaining means composed of coil springs; and, FIG. 3 is a perspective view showing reels R mounted in the reel housing and with the tape retaining means engaging the tape on the reels.

With particular reference to FIG. 2, there is shown substantially the same basic form of the invention as shown in FIG. 1, but in FIG. 2 a different type of reel and film retaining means is provided. As shown in FIG. 2, the reel chest and tape retaining means may well comprise a relatively low front wall 71' and a relatively high rear wall 72' connected by spaced parallel trapezoidal shaped sidewalls 73' and a bottom wall, not shown, which provides a chest having inclined upper edges and open at the top. As before, suitable cover means may be provided for the chest if desired. One or more partitions 74' extend between the front and rear walls 71' and 72' respectively to provide a plurality of compartments 75', each adapted to receive a reel of tape.

As before, two forms of the invention are shown in FIG. 2 and in one form a notch 76' is provided in the front wall 71' in the upper edge thereof and substantially midway of each compartment 75' and a similar notch 77' is provided in the upper edge of the rear wall 72' substantially midway of each compartment 75'. An endless elastic band in the form of a coil spring 78' is provided with an enlarged tape engaging member 9' thereon and the coil spring 78' extends around the bottom, front and rear walls of the chest and through the notches 76' and 77' with a portion 79' extending lengthwise of each compartment 75' adjacent the upper end thereof.

A reel of tape may be disposed in each compartment by sliding the same between the portion 79' of the coil spring 78' within the compartment and the partition 74' until the same is positioned entirely within the compartment 75' at which time the member 9' on portion 79' of the coil spring 78' may be positioned between the flanges of the reel and in engagement with the tape thereon to retain the reel in the compartment and prevent unwinding of the tape on such reel. In this way, one or more reels may be housed in a single chest and the tape prevented from unwinding therefrom, such reels being readily available for use at any time.

The other form of the invention shown in FIG. 2 involves the use of a slightly different type of tape retaining means and a different method of securing the same to the chest and, in this case, an elastic retaining band in the form of a coil spring 80' extends lengthwise of each compartment 75' and over the upper edges of the front wall 71' and rear wall 72', the ends 81' and 82' of the coil spring 80' being secured to the front and rear wall respectively by staples or other suitable fastening means 83' and 84'. A reel of tape is disposed in the compartment in this form of the invention in the same manner as above described in connection with the first form of the invention shown in FIG. 2 and no further description thereof appears necessary or desirable.

While both figures of the drawing show a partition in the chest to provide two compartments, it is, of course, to be understood that this is for illustrative purposes only and that the chest may be provided with only a single compartment for receiving a single reel of tape or may be provided with a plurality of partitions to provide any desired number of compartments for receiving a plurality of reels of tape.

It will be obvious that by the above described invention, there has been provided a relatively simple, yet highly effective combined reel chest and tape retaining means which may be conveniently utilized for receiving and housing a reel of tape and in which the reel is securely held in the housing and the tape thereon prevented from unwinding, regardless of the diameter of the tape on the reel.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A combined reel chest and tape retaining means comprising a front wall, a rear wall, sidewalls connecting said front and rear walls and a bottom wall providing a chest open at the top, an elastic band extending from the upper part of said front wall to the upper part of said rear wall and an enlarged tape engaging member on said band substantially midway between said front and rear walls, whereby a reel of tape may be disposed in said chest with said band and member received between the flanges of said reel to retain the same in said chest, said member engaging the peripheral surface of the tape to prevent unwinding and also serving to prevent entry of said band between the tape and a flange of the reel.

2. A combined reel chest and tape retaining means as defined in claim 1 in which a partition is provided extending from said front wall to said back wall and parallel to said sidewalls to provide a plurality of reel receiving compartments and in which an elastic band is provided for each compartment.

3. A combined reel chest and tape retaining means comprising a front wall, a rear wall, sidewalls connecting said front and rear walls and a bottom wall providing a chest open at the top and an endless elastic band extending from the upper part of said front wall to the upper part of said rear wall, whereby a reel of tape may be disposed in said chest with said band received between the flanges of said reel to retain the same in said chest and prevent unwinding of said tape.

4. A combined reel chest and tape retaining means as defined in claim 3 in which a partition is provided extending from said front wall to said back wall and parallel to said sidewalls to provide a plurality of reel receiving compartments and in which an elastic band is provided for each compartment.

5. A combined reel chest and tape retaining means comprising a relatively low front wall, a relatively high rear wall, sidewalls connecting said front and rear walls and a bottom wall providing a chest open at the top, said front and rear walls having a notch in the upper edge, an endless elastic band extending around said front and rear walls and said bottom wall and through said notches between said front and rear walls and an enlarged tape engaging member on said band substantially midway between said front and rear walls, whereby a reel of tape may be disposed in said chest with said band and member received between the flanges of said reel to retain the same in said chest, said member engaging the peripheral surface of said tape to prevent unwinding and also serving to prevent entry of said band between the tape and the flange of the reel.

6. A combined reel chest and tape retaining means as defined in claim 5 in which said elastic band is composed of a coil spring.

7. A combined reel chest and tape retaining means as defined in claim 5 in which a partition is provided extending from said front wall to said rear wall and parallel to said sidewalls to provide a plurality of reel receiving compartments and in which an elastic band is provided for each compartment.

8. A combined reel chest and tape retaining means as defined in claim 7 in which said elastic bands are composed of coil springs.

9. A combined reel chest and tape retaining means comprising a relatively low front wall, a relatively high rear wall, sidewalls connecting said front and rear walls and a bottom wall providing a chest open at the top, said front and rear walls having a notch in the upper edge and an endless elastic band extending around said front and rear walls and said bottom wall and through said notches between said front and rear walls, whereby a reel of tape may be disposed in said chest with said band received between the flanges of said reel to retain the same in said chest and prevent unwinding of said tape.

10. A combined reel chest and tape retaining means as defined in claim 9 in which said elastic band is composed of a coil spring.

11. A combined reel chest and tape retaining means as defined in claim 9 in which a partition is provided extending from said front wall to said rear wall and parallel to said sidewalls to provide a plurality of reel receiving compartments and in which an elastic band is provided for each compartment.

12. A combined reel chest and tape retaining means as defined in claim 11 in which said elastic bands are composed of coil springs.

13. A combined reel chest and tape retaining means comprising a relatively low front wall, a relatively high rear wall, sidewalls connecting said front and rear walls and a bottom wall providing a chest open at the top, an elastic band extending from the upper edge of the front wall to the upper edge of said rear wall, the ends of said band being secured to said front and rear walls and an enlarged tape engaging member on said band substantially midway between said front and rear walls, whereby a reel of tape may be disposed in said chest with said band and member received between the flanges of said reel to retain the same in said chest, said member engaging the peripheral surface of the tape to prevent unwinding and also serving to prevent entry of said band between the tape and a flange of the reel.

14. A combined reel chest and tape retaining means as defined in claim 13 in which said elastic band is composed of a coil spring.

15. A combined reel chest and tape retaining means as defined in claim 13 in which a partition is provided extending from said front wall to said rear wall and parallel to said sidewalls to provide a plurality of reel receiving compartments and in which an elastic band is provided for each compartment.

16. A combined reel chest and tape retaining means as defined in claim 15 in which said elastic bands are composed of coil springs.

17. A combined reel chest and tape retaining means comprising a relatively low front wall, a relatively high rear wall, sidewalls connecting said front and rear walls and a bottom wall providing a chest open at the top and an elastic band extending from the upper edge of said front wall to the upper edge of said rear wall, the ends of said band being secured to said front and rear walls, whereby a reel of tape may be disposed in said chest with said band received between the flanges of said reel to retain the same in said chest and prevent unwinding of said tape.

18. A combined reel chest and tape retaining means as defined in claim 17 in which said elastic band is composed of a coil spring.

19. A combined reel chest and tape retaining means as defined in claim 17 in whhich a partition is provided extending from said front wall to said rear wall and parallel to said sidewalls to provide a plurality of reel receiving compartments and in which an elastic band is provided for each compartment.

20. A combined reel chest and tape retaining means as defined in claim 19 in which said elastic bands are composed of coil springs.

References Cited in the file of this patent

UNITED STATES PATENTS

| | | |
|---|---|---|
| 254,840 | Perry | Mar. 14, 1882 |
| 579,295 | Delzell | Mar. 23, 1897 |
| 1,797,539 | Arthur | Mar. 24, 1931 |
| 2,422,594 | Stengren | June 17, 1947 |
| 2,442,557 | Cox | June 1, 1948 |